Patented Dec. 23, 1941

2,267,136

UNITED STATES PATENT OFFICE 2,267,136

PRODUCTION OF DENSE SODA ASH

Harold E. Robertson, Syracuse, N. Y., assignor to The Solvay Process Company, New York, N. Y., a corporation of New York No Drawing. Application January 10, 1940, Serial No. 313,201

6 Claims. (Cl. 23—63)

This invention relates to a process for the production of crystalline soda ash of high density.

In United States Patent No. 2,133,455, granted October 18, 1938, to Paul A. Keene and Arlie P. Julien, there is described a process for the production of dense crystalline soda ash involving the following steps:

A slurry of sodium bicarbonate is decomposed by treatment with steam to form a solution of sodium carbonate containing residual undecomposed bicarbonate. This solution is mixed with a saturated solution of sodium carbonate containing sodium chloride and the mixed solutions heated to evaporate them and crystallize out anhydrous sodium carbonate which is separated from the mother liquor and dried to obtain a dense crystalline soda ash. The mother liquor is recycled for addition of more sodium carbonate solution and evaporation to crystallize anhydrous sodium carbonate.

In operating such a process it was found the heat transfer surfaces of the heater used for boiling the sodium carbonate salt solution became covered with a scale of solid material which, if allowed to accumulate, seriously cut down the effectiveness of the heater. In order to prevent the accumulation of this scale, it was necessary frequently to interrupt the operations and remove the scale from the heater.

I discovered that the deposition of scale on the heating surfaces in carrying out the above process was due to the presence of bicarbonate in the solution being evaporated. In carrying out the Keene and Julien process, the solution of sodium carbonate formed by steaming a sodium bicarbonate slurry contains about 5.9% of residual undecomposed bicarbonate. A part of this bicarbonate will be decomposed in evaporating the solution to which it is added and from which the anhydrous sodium carbonate is crystallized. However, the solution from which the anhydrous carbonate is crystallized will still contain about 2.7% of undecomposed sodium bicarbonate. I discovered the scaling of the heat transfer surfaces could be largely overcome and also the quality of the dense ash produced by the process could be improved, by maintaining in the solution from which the anhydrous sodium carbonate is being crystallized a concentration of sodium bicarbonate within the limits of 0.1% to 1%. I found that by maintaining this concentration of bicarbonate in the solution the scaling of the heat transfer surfaces was greatly reduced, so that the necessary interruptions of the process to remove the scale were much less frequent. I also found the dense ash produced by the procedure was of an improved quality in that it consisted of relatively larger, better formed crystals of anhydrous sodium carbonate.

In carrying out the process of this invention in conjunction with the process of the above Keene and Julien patent, it is preferred to maintain the desired concentration of sodium bicarbonate in the solution evaporated to crystallize the anhydrous carbonate by adding to the solution prior to evaporating it caustic soda in amount sufficient to maintain the sodium bicarbonate concentration of the solution undergoing evaporation at substantially 0.5%; i. e., to maintain the bicarbonate concentration of the solution at 0.3% to 0.8% $NaHCO_3$. The caustic soda is most conveniently added as solution introduced into the sodium carbonate solution coming from the tower in which it is formed by decomposition of the sodium bicarbonate slurry or into the mixture of this fresh solution and recirculated mother liquor prior to introduction into the evaporator in which the anhydrous sodium carbonate is crystallized.

As pointed out hereinabove, the bicarbonate content of the solution from which the anhydrous sodium carbonate is crystallized is maintained at from 0.1% to 1%. If the anhydrous sodium carbonate is crystallized from a solution free from bicarbonate, I have found that although there is little scaling of the heat transfer surfaces the resulting soda ash product has a lower density and is not as satisfactory with respect to its physical characteristics as when at least 0.1% bicarbonate is present in the solution. By crystallizing the anhydrous sodium carbonate from a solution free from bicarbonate, it was found crystals of small size were formed which made it difficult to separate the crystallized sodium carbonate from the mother liquor. The centrifuge used for this purpose fouled very rapidly, an increased quantity of mother liquor was left in the crystals, and the product obtained after the crystals were dried contained an increased proportion of sodium chloride as an impurity as compared with the product obtained when operating in accordance with the present invention.

The invention is not limited to use in conjunction with the particular process of the above Keene and Julien patent but is broadly applicable to any procedure for the crystallization of anhydrous sodium carbonate from solutions of the same containing a salt such as sodium chloride to lower the transition temperature of sodium carbonate monohydrate to anhydrous sodium carbonate in contact with the solution to below the boiling point of the solution at atmospheric pressure. The process is not limited to one in which the sodium carbonate to be converted into anhydrous sodium carbonate is produced by decomposition of a sodium bicarbonate slurry but is broadly applicable to the treatment of sodium carbonate solutions produced by any method whatsoever. When the sodium carbonate supplied to the process is to be obtained by decomposition of sodium bicarbonate the desired content of bicarbonate in the solution evaporated to crystallize the anhydrous sodium carbonate may be maintained by appropriately controlling the degree of decomposition of the bicarbonate. If a sodium carbonate free from bicarbonate is supplied to the process, the requisite quantity of sodium bicarbonate is added in order to maintain 0.1% to 1% bicarbonate in the solution from which the anhydrous sodium carbonate is crystallized.

The invention is not limited to any particular method used for maintaining the desired bicarbonate content in the solution from which the anhydrous carbonate is crystallized. As described in the preceding paragraph, the bicarbonate content of the solution may be controlled either by removing excess bicarbonate in the materials supplied to the process or by adding the requisite amount of bicarbonate to the materials entering the process. It is possible by maintaining suitable conditions of evaporation (e. g., high temperatures by carrying out the evaporation under pressure and supplying to the solution adequate quantities of water which, by being boiled off, will carry out a sufficient quantity of carbon dioxide) to decompose in the evaporator in which the anhydrous sodium carbonate is crystallized bicarbonate entering the process in amount sufficient to maintain the bicarbonate content of the evaporating solution within the range of 0.1% to 1% $NaHCO_3$.

I claim:

1. In a process for the production of dense crystalline soda ash wherein solid anhydrous sodium carbonate is crystallized in an aqueous, saturated solution of sodium carbonate at a temperature above the transition temperature of sodium carbonate monohydrate to anhydrous sodium carbonate in contact with said solution, that improvement which comprises maintaining in said solution 0.1% to 1% sodium bicarbonate during the crystallization of the anhydrous sodium carbonate.

2. In a process for the production of dense crystalline soda ash by crystallization of anhydrous sodium carbonate from a solution thereof containing a salt which lowers the transition temperature of sodium carbonate monohydrate to anhydrous sodium carbonate in contact with the solution to below the boiling point of the solution at atmospheric pressure, that improvement which comprises maintaining in the solution during crystallization therefrom of said anhydrous sodium carbonate, in addition to said salt, 0.1% to 1% sodium bicarbonate.

3. In a process for the production of dense crystalline soda ash by crystallization of anhydrous sodium carbonate from a solution thereof containing sodium chloride to lower the transition temperature of sodium carbonate monohydrate to anhydrous sodium carbonate in contact with the solution, that improvement which comprises maintaining in the solution during crystallization therefrom of said anhydrous sodium carbonate 0.1% to 1% sodium bicarbonate.

4. In a process for the production of dense crystalline soda ash wherein a solution of sodium carbonate containing sufficient sodium chloride to lower the transition temperature of sodium carbonate monohydrate to anhydrous sodium carbonate in contact with the solution to below the boiling point of the solution at atmospheric pressure is evaporated and anhydrous sodium carbonate crystallized therefrom, that improvement which comprises maintaining in the solution during the crystallization of the anhydrous sodium carbonate substantially 0.5% sodium bicarbonate.

5. In a process for the production of dense crystalline soda ash wherein solid anhydrous sodium carbonate is crystallized in an aqueous, saturated solution of sodium carbonate at a temperature above the transition temperature of sodium carbonate monohydrate to anhydrous sodium carbonate in contact with said solution and the materials from which said solution is made up contain an amount of sodium bicarbonate such that their solution saturated with sodium carbonate at temperatures above said transition temperature contains a concentration of sodium bicarbonate outside the range 0.1% to 1% $NaHCO_3$, that improvement which comprises maintaining in the range of 0.1% to 1% $NaHCO_3$ the concentration of sodium bicarbonate in the solution in which the anhydrous sodium carbonate is crystallized.

6. In a process for the production of dense crystalline soda ash wherein an aqueous slurry of sodium bicarbonate is heated to decompose the bicarbonate and to form a solution of sodium carbonate containing undecomposed sodium bicarbonate and anhydrous sodium carbonate is crystallized from said solution, that improvement which comprises maintaining the concentration of sodium bicarbonate in said solution during said crystallization of anhydrous sodium carbonate in the range of 0.1% to 1% $NaHCO_3$.

HAROLD E. ROBERTSON.